United States Patent
Huberman et al.

(10) Patent No.: US 7,275,068 B2
(45) Date of Patent: Sep. 25, 2007

(54) DISCOVERING COMMUNITIES-OF-PRACTICE

(75) Inventors: Bernardo A. Huberman, Palo Alto, CA (US); Joshua Rogers Tyler, Palo Alto, CA (US); Dennis Wilkinson, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 10/741,247

(22) Filed: Dec. 19, 2003

(65) Prior Publication Data

US 2005/0138070 A1 Jun. 23, 2005

(51) Int. Cl.
  G06F 7/00 (2006.01)
  G06F 17/00 (2006.01)
  G06F 17/30 (2006.01)
(52) U.S. Cl. .................................. 707/104.1; 707/102
(58) Field of Classification Search .................. 707/10, 707/1, 102, 104.1; 715/760; 709/203
  See application file for complete search history.

(56) References Cited

U.S. PATENT DOCUMENTS

2005/0125408 A1* 6/2005 Somaroo et al. .............. 707/10

OTHER PUBLICATIONS

Eagle et al., "Social Network Computing", Fifth International Conference on Ubiquitous Computing, Seattle, WA, 2003.*
Goh et al., "Betweenness Centrality Correlation in Social Networks", Physical Review E 67, 017101, 2003.*
Adams et al., "Communitites of Practice: Bridging Technology and Knowlegde Assessment", Journal of Knowledge Management, vol. 4., No. 1, pp. 38-43, 2000.*
Gongla et al., "Evolving communities of practice: IBM Global Services experience", IBM Systems Journal, vol. 40, No. 4, pp. 843-862, 2001.*
Gluckler et al., "Knowing the flows is knowing who grows. An experimental exploration of the impact of physical, electronic and mobile communication flows on individual and team performance—a network approach", Working Paper, University of Frankfurt, 2003.*
Millen et al., "Stimulating a social engagement in a community network", Proc of the 2002 ACM Conference on Computer Supported Cooperative Work, pp. 306-313, 2002.*
Fontaine et al, "Understanding the benefit and costs of communities of practice", Communications of the ACM, vol. 45, Iss. 4, pp. 69-73, 2002.*
Tyler et. al, "Email as spectorscopy: automated discovery of community structure within organizations", Communities and Technology, pp. 81-96, 2003.*
Agnostini et al., "Stimulating Knowledge Discovery and Sharing", GROUP '03, pp. 248-257, Nov. 2003, ACM.*
Cross et al., "Knowing What We Know: Supporting Knowledge Creation and Sharing in Social Networks", IBM White Paper, Aug. 2000.*
Dr. E-Mail, V.A. Shiva, Intelligence in E_MAIL Are You Ready to Listen, Sep. 2002, DM Review, pp. 64, 65, 67.

* cited by examiner

Primary Examiner—Jeffrey Gaffin
Assistant Examiner—Michael J Hicks (57) ABSTRACT

Acquired data about communication interactions is used to form constructs which are indicative of an entity and communities-of-practice within the entity. A construction may be derived from the addressing data associated with the interactions to depict a communication network construct of the organization over time. The construction is selectively decomposed to smaller communications networks indicative of said communities-of-practice.

20 Claims, 6 Drawing Sheets

FIG.8

DISCOVERING COMMUNITIES-OF-PRACTICE

BACKGROUND

1. Technical Field

The disclosure relates generally to data mining and knowledge discovery.

2. Description of Related Art

A variety of person-to-person communication forms have been created throughout history. While many forms are still in use today, electronic mail, "e-mail," currently has become a ubiquitous tool in both the business and private sectors of everyday life. The use of e-mail and content of an e-mail message can be analyzed to derive other information not necessarily inherent in the content itself. When applied to e-mail messaging and e-mail content, natural language processing techniques and pattern recognition techniques can be used to derive other, non-inherent, information. For example, within an organization's computer network, based on an analysis of e-mail message header and attachment information, a system administrator may derive reports based on that information rather than the content to determine appropriate uses of e-mail in the network without reading the message content itself. As another example, monitoring and displaying to a user a variety of e-mail usage statistics may provide information that may affect the user's own e-mail usage practices and habits.

Identifying organizational patterns of individuals or other entities has been a focus for data mining and knowledge discovery researchers. An entity, whether formal or informal, that provides opportunities for communication among its members may be threaded by groups of individuals who may have similar goals and a shared understanding of their activities. These "communities-of-practice" may be generally thought of as informal groups of individuals or entities associated due to common interests or a common goal. For example, within a corporation, communities-of-practice may be generally though of as informal networks of collaboration between individuals or departments that naturally grow and coalesce toward achieving corporate goals.

Organizational hierarchy and organizational communities-of practice knowledge is a useful tool for many types of studies. For example, an organization may have an interest in understanding their hierarchy and communities-of-practice communication flow as a way of improving knowledge sharing, communications efficiency, and facilitation of member interactions and collaborations. With respect to businesses, hierarchical constructs—usually in the form of known manner "organization charts"—for the entire organization, for subunits thereof, or for informally related individuals or entities, are often created through extensive and expensive manual labor; the creator must be given access to precise, given data, namely, each employee's name, title, ranking of such a title, and the like. There is a need for data mining and knowledge discovery techniques for reducing such extensive manual labor tasks and improving derivative results.

It is known that a graph can be said to have community structure if it consists of subsets of vertices, or nodes, with many edges, or nodal interconnects, connecting vertices of the same subset but few edges between subsets. See e.g., Girvan, M., & Newman, M. (2002), "Community structure in social and biological networks," Proc. Natl. Acad. Sci. USA 99, 8271-8276, incorporated herein by reference, and referred to hereinafter as a "Girvan & Newman model." Partitioning a graph into discrete groupings of nodes can be based on the idea of "betweenness centrality." See e.g., Freeman, L. (1977), "A Set of Measures of Centrality Based on Betweenness," Sociometry 40, 35-41 and referred to hereinafter as "Freeman model;" Wilkinson, D. and Huberman, H. (2002), "A Method for Finding Communities of Related Genes," http://www.hpl.hp.com/shl/papers/communities/index.html, hereinafter referred to as "Wilkinson & Huberman method"; Brandes, U. (2001), "A Faster Algorithm for Betweenness Centrality," Journal of Mathematical Sociology 25 (2): 163-177, referred to hereinafter as the "Brandes algorithm"; and Newman, M. (2001), "Who is the Best Connected Scientist? A study of scientific co-authorship networks," Phys Rev. E64; and Newman, M. (2003), "The structure and function of complex networks," SIAM Review, June 2003. Each of these references is incorporated herein by reference.

BRIEF SUMMARY

The invention generally provides for using personal communications data for discovering communities-of-practice.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings in this specification should be understood as not being drawn to scale unless specifically annotated as such.

DETAILED DESCRIPTION

In general, acquired data about communication interactions, such as e-mail, including instant messaging exchanges, telephone call routing connections, voice mail messaging, paper mail, or any like "pairwise," person-to-person, communication data, in an organized entity or quasi-organized artificial entity—meaning that all participants are identifiable whether members of a specific formal organization or not—preferably is used to form constructs indicative of communities-of-practice of the entity. A graphical layout, or other imaging diagram, preferably is derived from the addressing data associated with the communication interactions to depict a communication network construct of the entity over time. A betweenness centrality algorithm (see e.g. Background references) may be used and modified for finding communities-of-practice within the graphical depiction of the communications network.

In order to describe details of the present invention, an exemplary embodiment using e-mail logs—a substantially complete set of the "To" and "From" information available at the communications network system level during a predetermined, or given, time period—is used for discovering communities-of-practice.

Figure 1:
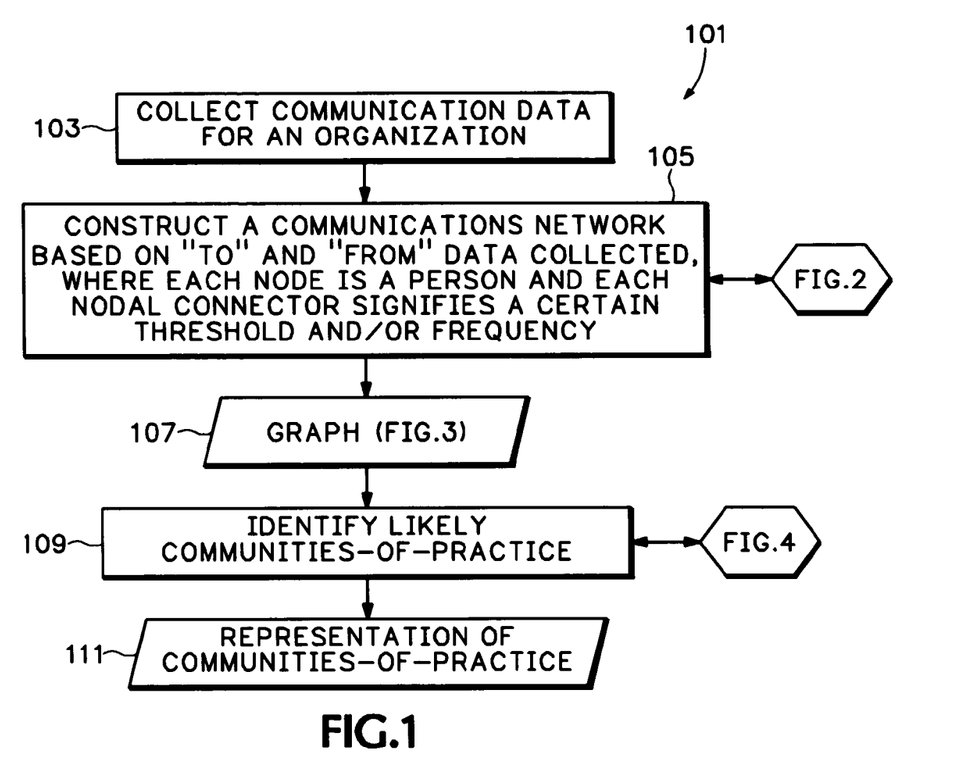
FIG. 1 is a flow chart for a methodology in accordance with an exemplary embodiment of the present invention.

FIG. 1 is a flow chart for a methodology in accordance with an exemplary embodiment of the present invention. The process 101 of identifying communities-of-practice from a substantially random communication network construct may be initiated by collecting 103 communication data for the organization-in-analysis. This data may be any form of pairwise communication, but for this exemplary embodiment is simply a system administrator's access to e-mail messaging "To, "From," "CC:" and "BCC" data—namely, the addressing information which is inherent in known manner e-mail messaging systems. For simplification of this detailed description, this addressing information is referred to as "To/From data." Over a given time period—which may be predetermined by a user-analyst or an entity-under-analysis itself where the target members are all known to be representative of typical of inter-organizational communications, e.g., one day, one week, two months, or the like—this To/From data is gathered.

Figure 2:
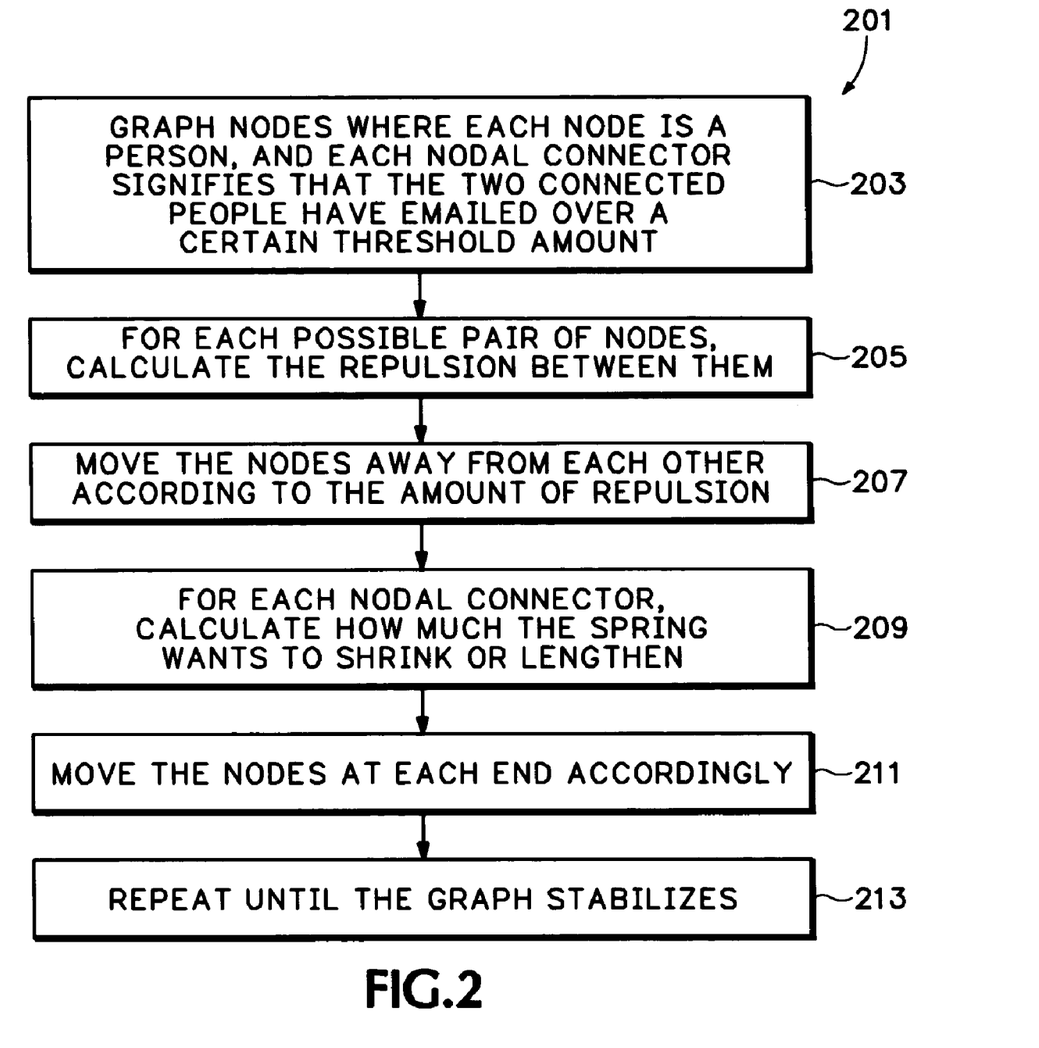
FIG. 2 is a flow chart for a methodology for imaging an organization which may be employed in the exemplary embodiment of the present invention as shown in FIG. 1.
Figure 3:
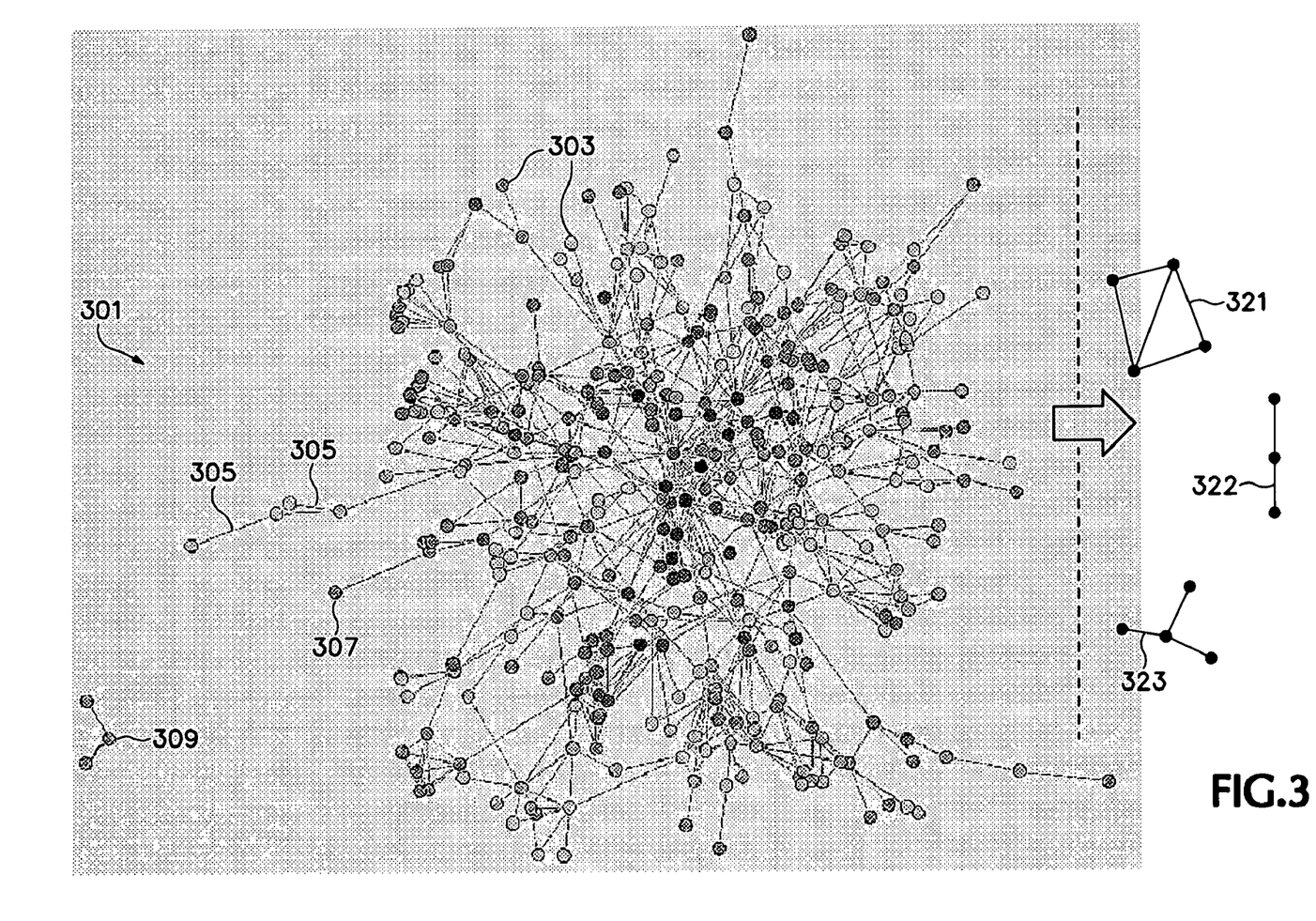
FIG. 3 is a schematic diagram in the form of an exemplary graph based on experimental data for a given organization and is illustrative of e-mail communications within an organizational structure and the derivation of communities-of-practice therefrom in accordance with the exemplary embodiment of FIGS. 1 and 2.

Based on the To/From data, an inter-organizational communications network construct may be formed 105. One useful, known manner, methodology 201 for forming a communications network construct is shown in FIG. 2 (Prior Art) and a resultant graphical layout 301 appropriate to the exemplary embodiment of the present invention is shown in FIG. 3. While many graphical or image constructs of a communications network may be adapted for implementation with respect to the present invention, for purposes of the exemplary embodiments described herein, a Girvan & Newman model (see Background section) is used.

Referring to both FIGS. 2 and 3, basically, the algorithm described by Girvan & Newman uses the To/From data to diagram nodes 303 where each node represents a person of the organization. In one aspect, each nodal connector 305 signifies that two connected people have e-mailed over a predetermined threshold amount. Note that in certain cases there may be no connector 305 between two nodes, e.g. between node 307 and node 309, indicating that the threshold has not been achieved. All nodes are considered to have an equal repulsion force associated with them; that is, nodes generally repel each other.

Each nodal connector 305 may be represented as a virtual spring with a given equal spring constant. Since the nodes repel each other, and each spring constant is identical, in the final diagram 301, in effect, length of each spring will be inversely proportional to the amount of e-mail between the person nodes 303; in other words, the higher the number of e-mail messages between two nodes, the shorter, "stronger," the connector. Thus, in another aspect, each nodal connector 305 is also indicative of a higher e-mail messaging frequency between nodes 303 at each end thereof.

A calculation 205 may be performed for each possible pair of nodes 303 to determine the repulsion between them; e.g., for a given repulsive force, repulsion may be illustrated as inverse with the square of the distance between them. The nodal pairs in analysis may be moved away from each other according to the calculated amount of repulsion 207.

For each nodal connector 305 inserted once the threshold is achieved between two nodes 303 based on the To/From data 103, how much each spring wants to shrink or lengthen may be calculated 209 based on the frequency of messaging.

Based on the shrink/lengthen calculation 209, the nodes 303 at each end may be moved accordingly.

The process is repeated 213 for each nodal pair until the diagram 301 is substantially stabilized. In FIG. 2 for example, the nodes may represent people within a given organizations e-mail network who exchanged a minimum threshold number of six e-mail messages over a two week period.

Returning now to FIG. 1, from diagraming 105 the organizational communications network, a graphical representation 107, FIG. 3, may be generated 107. It should be recognized that this representation may be useful as work product in and of itself for further analysis goals, depending on the specific implementation of the present invention. While the nodes are shown in grey scale in this specification, note that using a full color layout may provided a better visual representation; in other words, in the final product, the node receiving the highest number of e-mail messages may be a one and only red node, being indicative of the person related to the node being the head of the organization. All nodes are assumed to have equal mass and repulsion toward each other and all nodal connectors have equal spring constants. Based on the To/From data therefore, the nodes become grey scale, color, or otherwise coded in accordance with predicted hierarchy depth; e.g., the darker the grey, the higher that individual may be in the organizational structure. It should be recognized by those skilled in the art that other known manner or proprietary graphical representation techniques may be adapted to and employed in conjunction with specific implementations of the present invention to form a communications network construct. Two dimensional or three dimensional constructs may be employed as needed for a specific implementation. It should be recognized by those skilled in the art that generation of a communications network image, graph, or other intercommunications construct for the period-in-question, itself may be completely transparent to the user; in other words, the user may be only interested in the goal of generating an end product, consisting of the approximation of communities-of-practice. Thus, the addressing data may be simply stored in appropriate tables or the like toward achieving this goal. From the graph 107, an approximation of communities-of-practice is derived 109.

Figure 4:
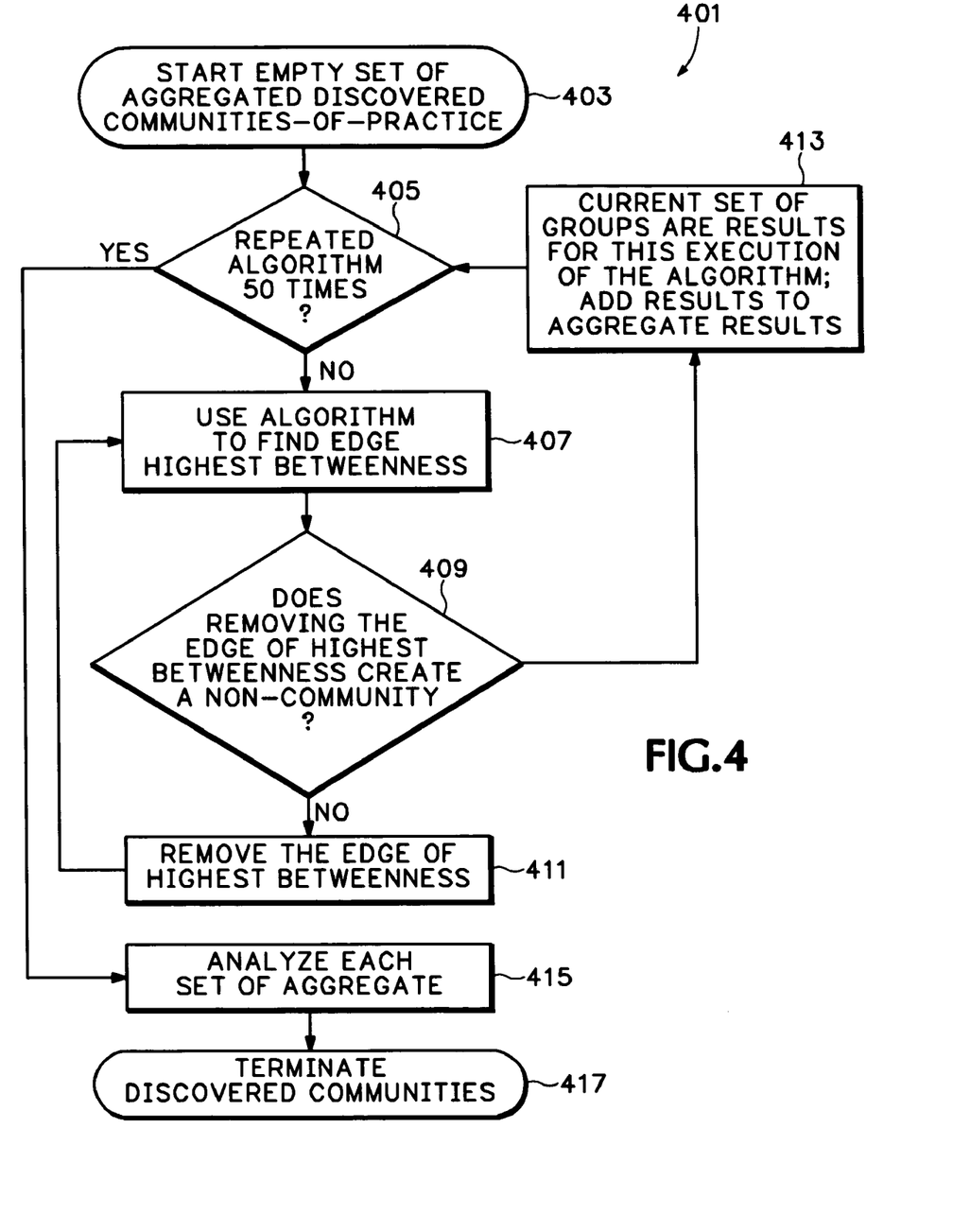
FIG. 4 is a flow chart illustrative of an exemplary embodiment of the present invention, depicting a methodology for discovering communities-of-practice in accordance with the embodiment of FIG. 1.

FIG. 4 is a flow chart illustrative of an exemplary embodiment of the present invention, depicting a methodology 401 for discovering communities-of-practice in accordance with the embodiment of FIG. 1. At the start 403, a set of yet-to-be-discovered communities-of-practice is empty. No persons/nodes have yet been associated with placement positions in a communications network nor a representation of the communities-of-practice. Basically, a set of communities-of-practice is preferably discovered by a "selective disassembly" of an organizational construct such as illustrated by FIG. 3 for the communications network 301 therein. To disassemble the graph into a predicted set of communities-of-practice, the graph may be partitioned into discrete communities of nodes. While a variety of methodologies may be adapted, for the purpose of description of the exemplary embodiment, the concept of betweenness centrality based on the Freeman model (see Background section supra) is employed. Based on the structure of the graph, the betweenness centrality approach is able to distinguish and suppress isolated inter-community correspondences, nodal links, so that the correspondents, i.e., representative nodes, may be appropriately placed in different communities-of-practice.

Figure 5:
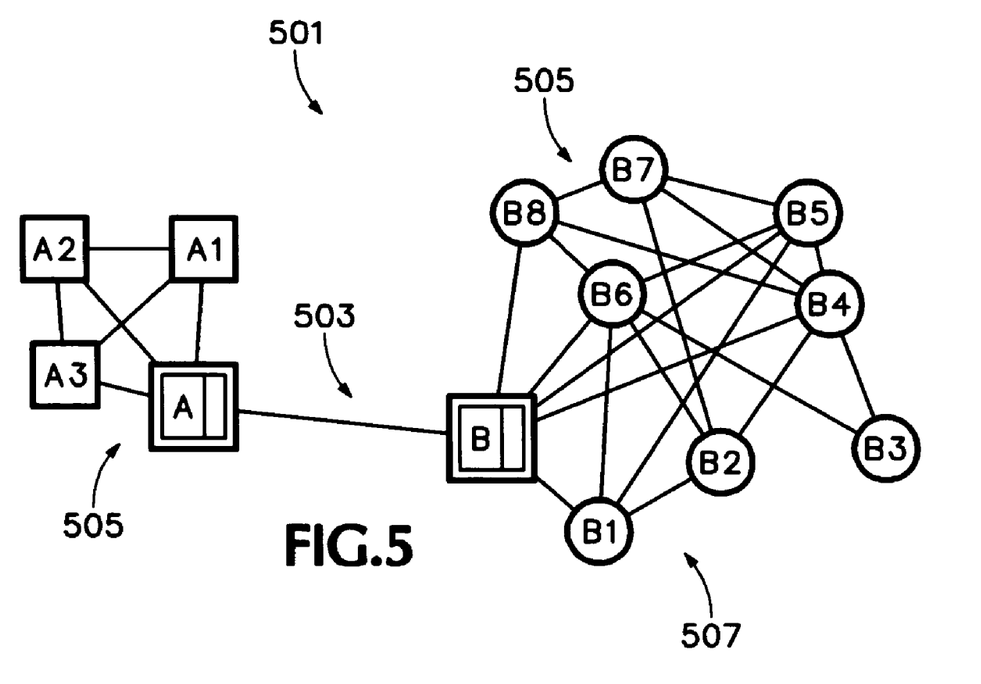
FIG. 5 is a schematic diagram exemplifying two potential communities-of-practice of an organizational structure as shown in FIG. 3.

It should be recognized that a variety of methods and algorithms, known manner or proprietary, may be employed for selectively disassembling, or "deconstructing," the exemplary network communications construct of FIG. 3. For the purpose of describing the exemplary embodiment of the present invention, a modified Brandes algorithm (see Background section supra) is explained hereinbelow. In order to explain this deconstruction process, an example of a smaller communications network graph 501 as shown in FIG. 5 is described. As will be seen, in accordance with the Brandes algorithm, there are two communities-of-practice predicted for this graph 501. The betweenness characteristic of an edge may be defined as the number of shortest paths that traverse it. Thus, this property distinguishes inter-community edges—which link many nodes in different communities and have a high betweenness—from intra-community edges—which have a low betweenness. Edge A-B 503 has the highest betweenness. Therefore, selectively removing only edge A-B results in two communities-of-practice 505, 507, the four nodes A-A3 denoted by squares and the nine nodes B-B8 denoted by circles, where intra-community nodal links remain.

It can now be recognized that the removal of an edge strongly affects the betweenness characteristic of many others; e.g., removing the edge B7-B8 505 also affects the betweenness characteristics for nodes B, B2, B4 and B6. Therefore, the betweenness of all edges must be repeatedly recalculated. The Brandes algorithm basic strategy is:

(1) consider the shortest paths between a single selected node, starting with the center or locus of the graph-under-consideration, as a current-node-under-analysis, and all other nodes (e.g., in FIG. 5, the shortest path from node B to B1 is B-B1, one link, and the shortest path from node B to B7 is B-B8-B7, two links, not B-B1-B2-B7, three links),
(2) calculate the betweenness of each edge due only to these shortest paths,
(3) add them to a running total,
(4) change the selected node and repeat (1)-(3) until every node has been selected as the "current" node, whereby
(5) the running total for each edge is then equal to exactly twice the exact betweenness of that edge (all endpoint nodes of edges has been considered twice).

While the Brandes algorithm may be considered a relatively fast process, it can be recognized that with a massive communications network, repeating the process of every node could become a slow process; e.g., for a large corporation like assignee herein which has about 150,000 employees; or, where a Web advertiser is using the present invention to determine patterns of dissemination of its advertisements in a quasi-organizational structure encompassing perhaps an entire country of Internet users. Therefore, the process may be modified as described hereinbelow.

Figure 6:
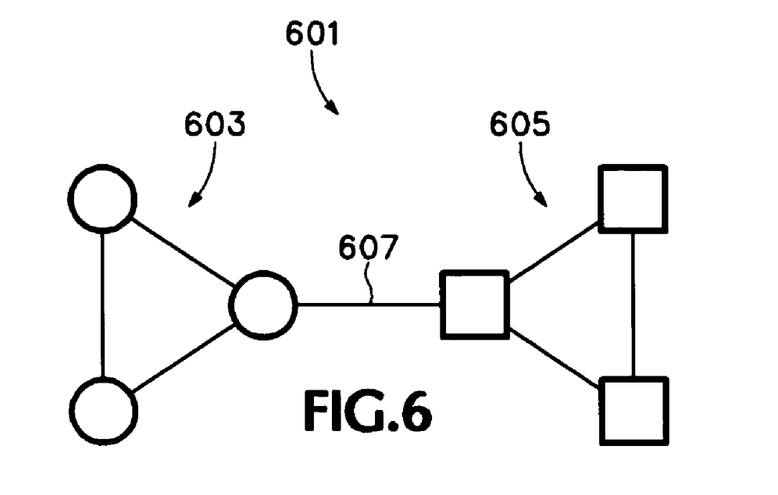
FIG. 6 is a schematic diagram illustrating an exemplary minimal communities-of-practice structure for an organizational structure as shown in FIG. 3.

In accordance with one exemplary embodiment of the present invention, the selective disassembly procedure may be halted—that is, the algorithm stops removing edges—when any further subdivision of the communications network into communities-of-practice may not be meaningful. An exemplary criterion for stopping removal is when an unconnected component reaches a predetermined size, e.g., five or fewer nodes cannot consist of two viable communities-of-practice. For this example, FIG. 6, a communications network construct 601, represents the smallest possible community-of-practice: six nodes comprising two triangles 603, 605, combined by one edge 607.

Communities-of-practice of a size greater than six nodes, such as group B in FIG. 5, can be identified. To identify this type of component community-of-practice, an intuitive threshold may be assigned based on the betweenness of an edge connecting a leaf node—also referred to as a "vertex of degree one"—with respect to the rest of the graph 301, FIG. 3. Consider the simpler example graph 701 of FIG. 7, which consists of one community-of-practice that does not contain distinct subcommunities. Applying a modified Brandes algorithm, looking to leaf node X, edge X-Y has the highest betweenness characteristic, indicating that the size of the largest distinct community with the graph 701 has a "size one," meaning there are no distinct sub-communities. In general, the single edge connecting a leaf node to the rest of a graph of N-nodes, where N is the sum total of all nodes, has a betweenness of minus-one, −1, because it contains the shortest path from that leaf node to all −1 other nodes. The stopping criterion for component communities of less than and equal to six nodes is that the highest betweenness of any edge in the component is equal to or less than minus-one, −1.

In addition to the removal of any one edge affecting the betweenness of all the other edges, the order of removal of edges affects which edges may be subsequently removed. This may be found to be particularly true with respect to very large communications network constructs. Early in the network deconstruction process there may be many inter-community edges which have a high betweenness characteristic. The choice of order of removal, while arbitrary, effectively may dictate which edges will be removed subsequently. The present invention takes advantage of the arbitrariness to repeatedly partition the communications network, e.g., FIG. 3, graphical construct 301, into many different sets of communities-of-practice. Comparison of the many different sets then may be made, FIG. 1, 107, and an aggregate result 109 of a set of communities-of-practice is provided, represented in any suitable form for a particular implementation; e.g., listing, illustration, or the like. Therefore, in the preferred embodiment the algorithm may be applied 405, FIG. 4, to the communications network construct 301 a predetermined number of times, e.g., fifty times.

Figure 8:
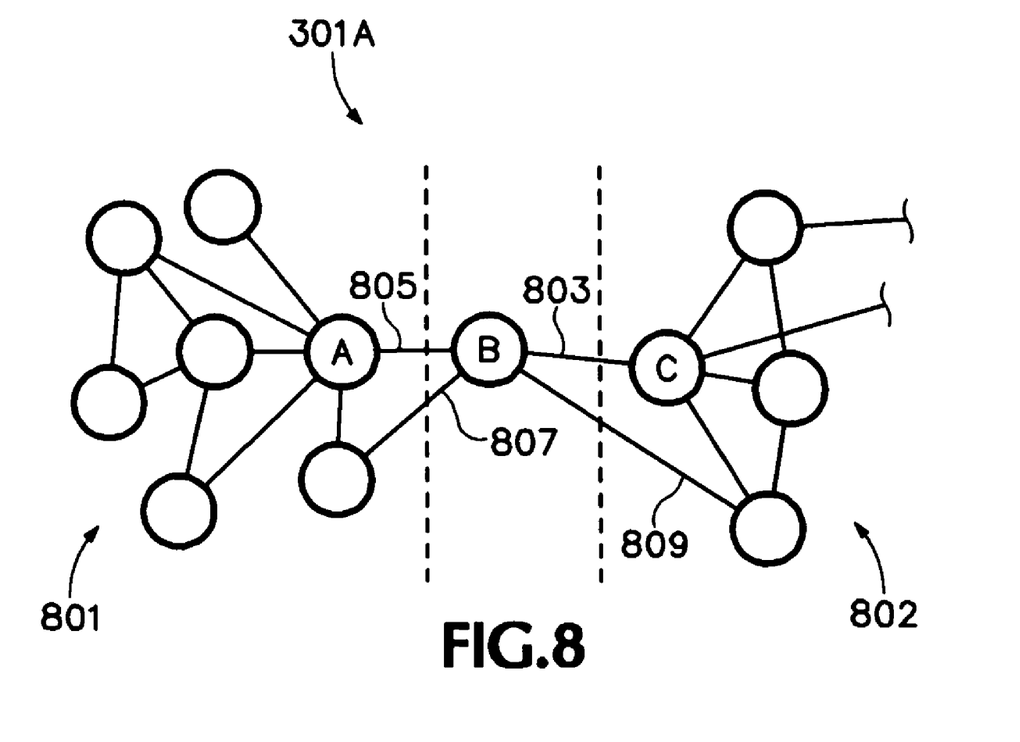
FIG. 8 is a schematic diagram illustrating exemplary placement of an individual within two communities-of-practice of an organizational structure as shown in FIG. 3.

FIG. 8 is a small exemplary piece 301A of communications network construct 301, FIG. 3, to illustrate the mechanics of placement of a particular node B into a particular, possible community-of-practice 801 or 802. Among its edges, edge B-C 803 initially has the highest betweenness along with edge A-B 805. If edge B-C 803 is removed first, edge A-B 805 becomes an intra-community edge with low betweenness which will never be removed and node B will eventually be placed in a community 801 with node A. Conversely, if edge A-B 805 is removed first, edge B-C 803 would have been rendered intra-community and node B would end up in community 802 with node C. It may not be clear where node B should end up based on its communication practices in this particular construct 301A; clearly from a logical standpoint, looking at the symmetry of nodal linkages 803, 805, 807, 809, node B could rightly be considered to be a part of both potential communities-of-practice 801, 802. The choice of order may be arbitrarily made. However, it should be recognized that this arbitrariness in essence may be helpful when the algorithm is iteratively applied 405 to generate different plausible communities-of-practice.

Figure 7:
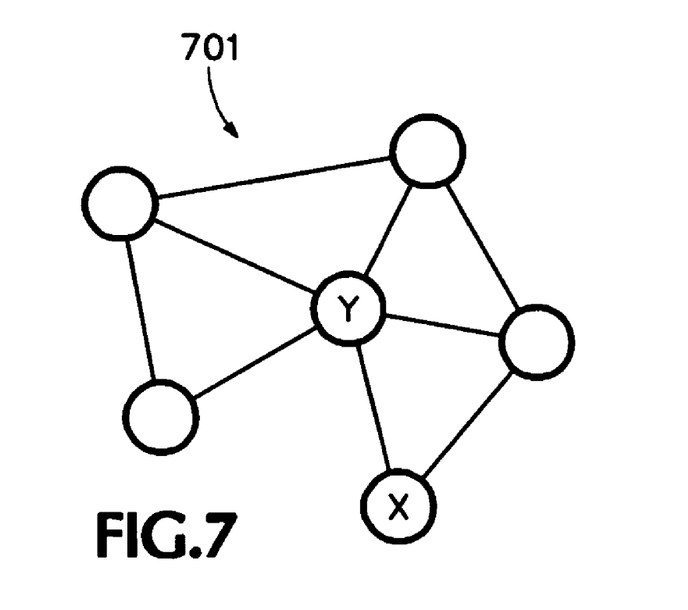
FIG. 7 is a schematic diagram illustrating an exemplary community-of-practice structure that does not contain distinct subcommunities in an organizational structure as shown in FIG. 3.

In partitioning a large connected component of nodes, instead of sequentially using every node as the central or current-node-under-analysis, supra, the process cycles randomly through at least "m" centers, where "m" is some predetermined cut-off point, until the betweenness of at least one edge exceeds a threshold based on the betweenness of a leaf vertex, "X" in FIG. 7. The process determines this as the current edge of highest betweenness, FIG. 4, 407, A test 409 is performed to ensure that the removal of the current edge will not create a "non-community," a community-of-practice where the number of member nodes is less than or equal to the threshold; e.g., in the present example, five nodes. If removal does not create a non-community, 409 NO-path, the edge whose betweenness is highest at that point is removed 411. The process repeats—illustrated by the feedback loop from 411 to 407—for each current node for potential communities having a predetermined size until the graph is broken into communities-of-practice identified by the predetermined criterion. If removal of a current-node-under-analysis does create a non-community, 409, YES-path, the communications network graph 301 has been disassembled as far as possible in the current iteration and the results are put 413 into storage as part of an aggregate of results. The process starts over—illustrated by a feedback loop from 413 to 405—to perform a second deconstruction, arbitrarily selecting a new current-node-under-analysis to begin with.

Applying the algorithm "n" times, e.g., to continue the same example, n=50, fifty potential communities-of-practice structures are derived with respect to the network communications structure 301, FIG. 3. In other words, applying the process fifty times compiles an aggregate of fifty possible differing structures of communities-of-practice. Once the iteration number fifty is complete, 405, YES-path, the fifty possible structures are analyzed 415.

As one example, after imposing fifty possible communities-of-practice structures on the communications network construct 301, assume a community of correspondents, represented by nodes A, B, C, and D, are found in twenty-five of the fifty structures, a community of people A, B, C, D, and E are found in another twenty of the fifty structures, and a community of people A, B, C, D, E and F are found in the remaining five structures. This may be reported as: A(50) B(50), C(50), D(50), E(25), F(5). This may signify that A, B, C, and D form a "well-defined community," E is related to this community but also too some others, and F may be only slightly related or unrelated to this community. This report may be output 417 as a final work product of the process. It will be recognized by those skilled in the art that the comparison analysis may be implemented in many ways depending on the specific goals related thereto; see e.g., the Wilkinson & Huberman method, supra. For the main part, the goal may be to have an output from the betweenness centrality network disassembly which may be a single most plausible representation of distinct communities-of-practice structures associated with the starting communications network structure, illustrated in FIG. 3 as communities-of-practice 321, 322, 323, . . . et seq.

As a subsidiary refinement to the output, once a communities-of-practice representation or structure has been determined 417, a strength of community attachment for any member may also be approximated. After the graph 301 is partitioned, a count of how many times an individual belonged to a particular community may be determined. For example, looking back to FIG. 5, in community B, node B3 had the fewest intra-community links and node B6 had the most. B3 may be considered either a peripheral member of the community or perhaps a non-member.

Having been described hereinabove, it should now be apparent to persons skilled in the art that the present invention may be implemented in software, firmware, or the like, computer programs and contained in a computer memory device.

The present invention may be implemented as a method of doing business such as by being a purveyor of software or providing a service in which the business employs the above-described methodologies to present a client organization with a finished product such as communities-of-practice listings, illustrations or other tools illustrated by exemplary FIGS. 3, 5-8, a detailed report, or the like, based on the data mining and knowledge discovery results from analyzing specific communications data provided by the client organization.

It is also to be recognized that only the To/From data may be needed for the analysis of hierarchical structure and discovery of communities-of-practice. In other words, given a database of To/From data for a given set of individual nodal artifices—which may be persons, organizations, collectives, and the like—prediction of some form of relationship between those nodes may be implied.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art, particularly with respect to adaptations for other peer-to-peer communications data such as telephone call logs, instant e-mail messaging exchanges, and the like. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A computer-implemented method for discovering communities-of-practice from a communications network structure for a set of individual members, the method comprising:
   selecting a current member of said, set;
   deriving from the communications network data structure represented as a database including data for a given characteristic for each member of the set at least one communities-of-practice which identifies a group of members with a common interest or goal within said network structure among individual members coupled to said current member by deconstructing said network data structure associated with said current member based in part upon the given characteristic relational to said communications network data structure;
   representing each of the at least one derived communities-of-practice in a respective data structure; and
   storing each communities-of-practice data structure in a memory.

2. The computer-implemented method as set forth in claim 1 further comprising:
   selecting a succession of members of said set,
   repeating said deriving of at least one communities-of-practice data structure identifying a group of members with a common interest or goal for each of said members, and
   deriving a plurality of communities-of-practice data structures for said communications network data structure.

3. The computer-implemented method as set forth in claim 2 further comprising:
   repeating said deriving for a first set of arbitrarily selected members,
   deriving a first plurality of communities-of-practice data structures based on said first set,
   selecting at least one second set of arbitrarily selected members,
   repeating said deriving a second plurality of communities-of-practice data structures based on said at least one second set,
   based on the data stored in the communities-of-practice data structures from said deriving for each said set of members,
   forming a communities-of-practice data structure for all said members.

4. The computer-implemented method as set forth in claim 1 wherein said communications network data structure is based on addressing data of communications by said set of individual members.

5. The computer-implemented method as set forth in claim 1 wherein said given characteristic is a betweenness centrality function.

6. A computer-implemented method for discovering communities-of-practice based upon a communications network construct data structure associated with a set of members, the method comprising:
   selecting a first member represented in the construct data structure;
   determining one or more communities-of-practice for association with the first member which identify other members having at least one common interest or goal with the first member by distinguishing and suppressing isolated inter-community communication linkages within the construct data structure;
   representing each of the one or more identified communities-of-practice in a respective data structure; and
   storing each communities-of-practice data structure in a memory.

7. The computer-implemented method as set forth in claim 6 wherein said selecting a first member of the construct is based on betweenness centrality determination.

8. The computer-implemented method as set forth in claim 7 wherein said betweenness centrality determination further comprises:
   distinguishing inter-communities-of-practice linkages which link a predetermined number of members of the construct data structure;
   defining a relatively high betweenness characteristic, from intra-community linkages between members, and
   defining a relatively low betweenness characteristic.

9. The computer-implemented method as set forth in claim 6 said distinguishing and suppressing isolated inter-community communication linkages within the construct data structure further comprising:
   repeatedly identifying inter-community linkages of a predetermined large betweenness characteristic, and
   removing said biter-community linkages.

10. A computer-implemented method of doing business, the method comprising:
    receiving pairwise communications addressing data;
    deriving a hierarchical relationship of individuals based upon said addressing data;
    representing said hierarchical relationship in a data structure stored in a memory;
    deconstructing said hierarchical relationship as represented in the data structure by deriving communities-of-practice among said individuals based upon a given characteristic relational to said addressing data wherein a community-of-practice represents a group of members sharing a common interest or goal; and
    representing each said derived communities-of-practice in a respective data structure;
    storing each communities-of-practice data structure in the memory;
    and traversing one of the communities-of-practice data structure associated with a common interest or goal in order to identify the group of members associated with that common interest or goal.

11. The computer-implemented method as set forth in claim 10 wherein said given characteristic relational to said addressing data is a betweenness centrality determination.

12. The computer-implemented method as set forth in claim 11 wherein an organization is represented by a plurality of N-nodes, where N is the sum total of all nodes, connected by edges, and a single edge connecting a leaf node has a betweenness of minus-one, −1, containing a shortest path from that leaf node all −1 other nodes, and a stopping criterion is set for component communities-of-practice of less than and equal to a minimum number of nodes forming a communities-of-practice is the highest betweenness of any edge in any component is equal to or less than N−1.

13. A computer-implemented system for discovering communities-of-practice, the system comprising:
    means for forming a communications network data structure based upon addressing information for pairwise communications over a predetermined period of time;
    means for selectively disassembling said communications network data structure based in part upon distinguishing and suppressing inter-community communications linkages as represented in the network data structure such that correspondents of said inter-community communications are assigned to different communities-of-practices;

means for representing each of the different communities-of-practice in a respective data structure; and storing each communities-of-practice data structure in a memory.

14. The computer-implemented system as set forth in claim 13, said means for selectively disassembling further comprising:

means for identifying inter-community communication linkage representations among members of said structure.

15. The computer-implemented system as set forth in claim 14, said means for identifying inter-community communications linkage representations further comprises:

means for determining betweenness centrality of said communication linkage representations.

16. The computer-implemented system as set forth in claim 15, said means for determining betweenness centrality of said communication linkage representations further comprises:

means for selecting each member associated with the communications network data structure sequentially, means for finding shortest linkage paths as represented in the communications network data structure between a current selected member and all other members, means for assigning a betweenness value to each of said shortest linkage paths, means for tabulating a running total for each of said linkage paths, and assigning a betweenness centrality value to each of said linkage paths equal to one-half the running total therefor.

17. The computer-implemented system as set faith in claim 16, said means for selecting each member further comprising:

means for arbitrarily selecting members up to a predetermined number of members.

18. The computer-implemented system as set forth in claim 16 comprising:

means for selecting a current member of the communications network data structure;

means for forming a first subset of members of the communications network data structure including said current member and each member of the network having a threshold number of communication links with said current member;

means for finding a characteristic associating members within said first subset such that said first subset is divided into communities-of-practice based on said characteristic;

means for storing a respective data structure representing each communities-of-practice; and means for iterating forming subsets and dividing said subsets into communities-of-practice.

19. The computer-implemented system as set forth in claim 18 further comprising:

means for aggregating result by said means for iterating and for providing a composite communities-of-practice structure therefrom.

20. A computer readable medium having encoded thereon instructions which when executed by a processor perform a method for discovering communities-of-practice from a communications network data structure, the method comprising:

selecting a first member represented in the communications network data structure;

determining one or more communities-of-practice structures for association with the first member which identity other members having at least one common interest or goal with the first member by distinguishing and suppressing isolated inter-community communication linkages within the communications network data structure;

representing each of the one or more identified communities-of-practice in a respective data structure; and storing each communities-of-practice data structure in a memory.

* * * * *

UNITED STATES PATENT AND TRADEMARK OFFICE
CERTIFICATE OF CORRECTION

PATENT NO. : 7,275,068 B2  Page 1 of 1
APPLICATION NO. : 10/741247
DATED : September 25, 2007
INVENTOR(S) : Bernardo A. Huberman et al.

It is certified that error appears in the above-identified patent and that said Letters Patent is hereby corrected as shown below:

In column 9, line 5, in Claim 1, after "said" delete ",".

In column 10, line 9, in Claim 8, after "structure" delete ";" and insert -- , --, therefor.

In column 10, line 19, in Claim 9, delete "biter-community" and insert -- inter-community --, therefor.

In column 10, line 50, in Claim 12, after "node" insert -- to --.

In column 11, line 32, in Claim 17, delete "faith" and insert -- forth --, therefor.

In column 12, line 27, in Claim 20, after "practice" insert -- data --.

In column 12, line 29, in Claim 20, delete "identity" and insert -- identify --, therefor.

Signed and Sealed this

Twenty-second Day of July, 2008

JON W. DUDAS
*Director of the United States Patent and Trademark Office*